United States Patent Office 3,390,077
Patented June 25, 1968

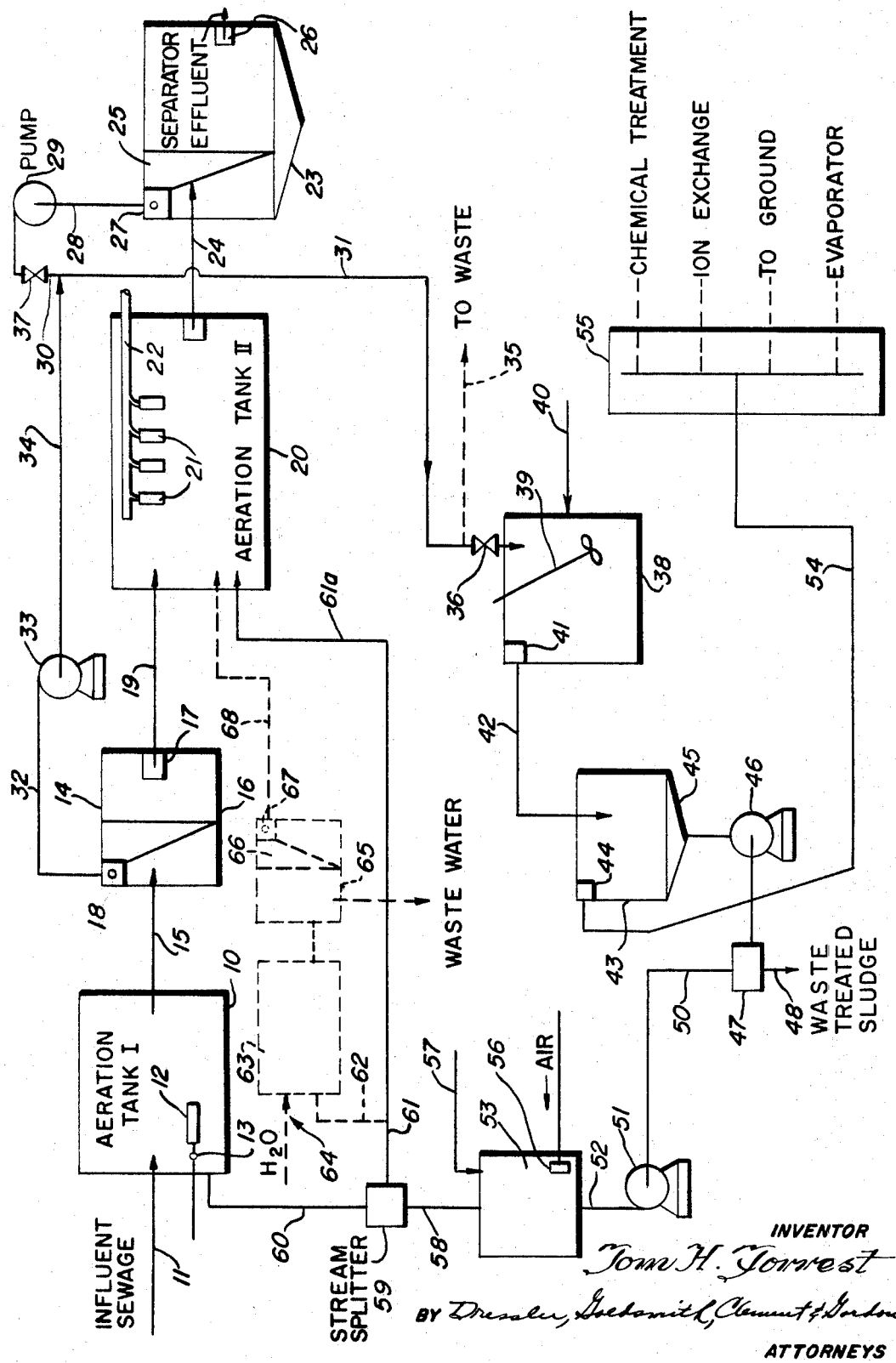

3,390,077
SEWAGE TREATMENT PROCESS
Tom H. Forrest, Evanston, Ill., assignor to FMC Corporation, a corporation of Delaware
Filed May 4, 1966, Ser. No. 547,495
8 Claims. (Cl. 210—6)

ABSTRACT OF THE DISCLOSURE

The process of this invention deals with the treatment of sewage to produce an effluent having a low biochemical oxygen demand and a markedly reduced content of nutrients such as phosphorus compounds. In the illustrative embodiment, sewage is subjected to two stages of aeration and settling. In the aeration stages, a minimum of 60 pounds of suspended solids in the mixed liquor per pound of phosphate-containing material introduced into the mixed liquor by the influent medium. Sludge recovered by settling the mixed liquors from both the first and aeration stages are washed with acidulated water to removed phosphates. The washed sludge is aerated before return to the sewage treatment system to insure that it is not degraded in activity due to being held under anaerobic conditions for too long a period in the course of washing to free the sludge of nutrients.

---

This invention relates to an aerobic process for the treatment of sewage. More particularly, it relates to an activated sludge type process which produces a dischargeable aqueous medium which is substantially free of phosphorus-containing materials. Still more particularly, it relates to an activated sludge type process wherein sludge to be recycled is subjected to treatment which eliminates at least a major portion of the soluble minerals recirculated in conventional systems.

In accordance with this invention, an aerobic sewage treatment system is provided which involves aeration and separation stages. In this system, mixed liquor is aerated and the aerated mixed liquor is separated into two phases to recover a concentrate of sludge having phosphorus material as an integral part of the sludge or merely associated therewith, which phosphorus material will hereinafter be referred to as phosphate, the connotation having reference to the presence of an anion containing phosphorus when present as a component of a solution. The aeration and separation conditions should be such as to result in a sludge phase with a maximum of phosphorus material therein. The phosphate-rich sludge phase is subjected to agitation in contact with low phosphate content aqueous medium of a volume which is a minor proportion of the total volume flow of the system, for a time sufficient to effect transfer of water-soluble phosphate material from the sludge to the aqueous medium. Phosphate enriched aqueous medium is separated from the phosphate depleted sludge and the phosphate depleted sludge is recycled in quantities to form mixed liquor of controlled solids content. The phosphate enriched aqueous medium may be disposed of by suitable means or treated to remove phosphorus-containing anions so that the aqueous medium is suitable for discharge to a receiving body of liquid, for reuse, etc.

In the conventional activated sludge systems in use today, the sewage is subjected to the usual screening, degritting, etc., operations following which the sewage is mixed with material recycled from a settling tank and subjected to aeration. The amount of recycled sludge constitutes a volume of from about 25% to 200%, based upon the volume of incoming sewage generally having a B.O.D. in the range between about 100 p.p.m. and 400 p.p.m.

This type of treatment, with continuous recycle of large volumes of sludge-containing liquids, creates a condition whereby equilibriums are established at relatively high levels of concentration for dissolved mineral elements such as phosphorus generally present in the form of anions, such as phosphate. Discharge of effluent daily from systems having a high mineral content, into receiving bodies, leads eventually to contamination of these bodies with the consequent results of promoting undesirable blooms, generating obnoxious odors, etc.

Most frequently, conventional activated sludge systems of sewage treatment reach equilibrium conditions favorable to accumulation in the liquid, as dissolved phosphorus bearing material, such that the system discharges an effluent of relatively high phosphate content.

Heretofore, the accumulation of equilibrium amounts of phosphate in the liquid of activated sludge systems has been recognized, but since emphasis was on B.O.D. removal, a high phosphate content in the effluent was accepted as a necessary disadvantage. Consequently, steps were taken, only when serious conditions arose, such as eliminating phosphates from the plant effluent using lime, ferric chloride, and like acting chemicals.

Now it has been discovered that the buildup of phosphorus, i.e., phosphorus-containing anions, to equilibrium proportions in an activated sludge recycle system, can be prevented by utilizing a sludge, whose phosphorus-containing anion content has been depleted, for recycle and formation of mixed liquor. Treatment of this mixed liquor is for a time conducive to association of most of the phosphorus-containing anions with the sludge circulating in the aerated mixed liquor, which sludge is being maintained in the mixed liquor under aeration in concentrations considerably higher than that required for conventional B.O.D. removal.

In one embodiment, the process involves mixing influent sewage with phosphate depleted sludge to form a mixed liquor, aerating the mixed liquor in a first aeration treatment stage under cconditions of solids concentration and time which generally will accomplish only partial removal of B.O.D. but will be short of that permitting appreciable transfer of phosphates from the sludge, i.e., aerating for a period in excess of that required for transformation of phosphate-containing material to sequesterable or soluble phosphates in the presence of the concentration of suspended solids present, which solids concentration must be at least sufficient to catalyze B.O.D. removal and in no event, if a significant level of phosphate removal is to be attained, less than 60 pounds of suspended solids per pound of phosphate-containing material in the mixed liquor under aeration, separating this first produced sludge from the mixed liquor in a separation operation conducted under substantially aerobic conditions, discharging a phosphate anion rich sludge to a point for suitable subsequent processing, discharging the overflow from the first separation operation to a second aeration stage where B.O.D. removal is completed and residual phosphate anion is associated in the sludge, discharging a mixed liquor from the second aeration stage to a second separation stage, separating a sludge and a substantially phosphate-free effluent for discharge from the system, combining said sludge which now generally totals a volume in the range between about 5% and 50% of the total flow entering and leaving the system, contacting said sludge under agitating conditions with low phosphate anion content aqueous medium for a period of time effecting transfer of water-soluble phosphate material from the sludge to the aqueous medium, separating phosphate-depleted sludge and returning at least a portion thereof to the zones for aeration of mixed liquor.

More in detail, in one mode of operation, the process of treating sewage comprises mixing raw sewage, the insoluble solids of which preferably are in a comminuted form, with a substantially reduced phosphate content recycle sludge and aerating the mixture. In order to avoid a length of time in this first aeration stage which would permit transfer of sludge associated phosphate to the aqueous media, the first aeration operation is of limited duration which time generally will be a period in which B.O.D. removal will be in the range between about 45% and 75%. Sewage is introduced into the first aeration stage generally in metered amounts. The mixed liquor is subjected to aeration on a continuous or intermittent basis, preferably a continuous basis. B.O.D. loadings of the first aeration stage are, generally, limited loadings in the range between about 50 and 300 pounds of B.O.D. per 1,000 cubic feet of aeration volume, although the loadings under some specific conditions can be higher.

The solids concentration to be maintained in the single stage or the first stage of aeration of the instant process generally must exceed the solids concentration maintained in the aeration stage of conventional activated sludge systems. In general, the solids concentration to be maintained in the instant process, will be in the range between 1.5 and 5 times that of the conventional systems, which loadings for conventional systems of 50 to 300 pounds of B.O.D. per 1,000 cubic feet of aeration volume, while variable depending upon the time of treatment, generally within the range of 1 to 2 hours, will usually be in the range between about 1,000 and 3,000 p.p.m.

The amount of sludge solids required in a mixed liquor under aeration in order to accomplish sequestration of phosphates in a sludge to an extent such that removal of sludge from the mixed liquor will leave an aqueous medium of low phosphate content, is about 60 pounds minimum per pound of phosphorus-containing material, analyzed as phosphates, which is the form in which most of the phosphorus-containing material apparently is present after aeration of mixed liquor. This quantity of sludge solids is based upon the assumptions of the use for recycle of a substantially phosphate depleted sludge and of the substantially complete removal of phosphates from mixed liquor.

When the sludge being recycled contains analyzable amounts of phosphates, the amount of sludge required to sequester phosphates will be increased correspondingly. In other words, the phosphates in the sludge must be taken into account in determining the total phosphate in the mixed liquor being aerated. Generally, if phosphates associated with the sludge are transferred only to the liquor associated therewith as it leaves the aeration tank, the transfer may be incomplete and the sludge while depleted in phosphate content will nevertheless not be devoid or substantially free of phosphate. As a consequence of the amount of phosphate in the sludge being recycled, the pounds of sludge solids per pound of phosphate in the mixed liquor in the aeration tank required to maintain the desired removal level for phosphates will necessarily be increased, i.e., be between, for example, 70 and 80 pounds.

Solids concentration in the mixed liquor in the aeration tank is a major factor both in determining time for removal of the required amounts of phosphates, i.e., for 75%, 90%, substantially complete removal and for the degree of removal. As was pointed out above, 60 to 80 pounds of sludge solids per pound of phosphates, sequesters the phosphates so that the sludge can be removed, for example, at the end of 1 hour with assurance that it will have associated with it substantially all of the phosphate which the sludge can sequester.

The time of aeration of the mixed liquor to accomplish conversion of phosphates to sequesterable form and sequestration thereof is directly influenced by the concentration of sludge solids present in the mixed liquor. Before phosphorus-containing material other than soluble phosphates can be sequestered, they must be rendered available. When the solids concentration is near the minimum of 60 pounds of suspended solids per pound of phosphorus-containing material or less, i.e., less than enough for rendering of the phosphate available that is in a period of a few seconds to 15 minutes, time of aeration and the overall time for sequestering phosphates becomes an important factor. If the suspended solids of the mixed liquor is more than enough for quick conversion of the phosphates, it becomes a minor factor, for example, if the solids concentration is near the minimum of 60 pounds of suspended solids per pound of phosphates, 95% of the phosphates will only be rendered available in about 10 hours of aeration and, therefore, substantially complete sequestering can only be completed in a time in excess thereof such as 16 to 24 hours. If the solids concentration is appreciably higher, for example, 100 pounds of suspended solids, per pound of phosphates, 95% of the phosphates can be rendered available in about 40 minutes and, therefore, substantially complete sequestering can be completed in about 1 hour. If the solids concentration is of the order of 150 to 170 pounds of suspended solids per pound of phosphate, 95% of the phosphates can be rendered available in about 10 minutes and, therefore, the sequestration can be substantially completed in about a half hour. In general, the solids concentration in the mixed liquor will be in the range between 60 and 250 pounds per pound of phosphate present when operating for maximum phosphate removal.

When the solids content of the mixed liquor under aeration is less than the minimum of about 60 pounds per pound of phosphate present, the phosphate removal falls in proportion to the ratio that the pounds of solids present per pound of phosphate bears to the minimum of 60 pounds of sludge solids per pound of phosphate.

While we do not wish to be bound by theory, it appears that only a small part of the total phosphorus-containing material present in the mixed liquor is in the form of soluble phosphates initially, but appear in a form, analyzable as phosphate anion following aeration, which can be sequestered by the sludge solids. To illustrate, when a sewage having 90 mg. per liter of phosphorus-containing material is being introduced continuously into an aeration tank and a sludge solids concentration of 3,000 p.p.m. is being maintained, only about 80% of total phosphorus bearing material, measured as phosphate, will be sequestered in a 24 hour aeration period.

If the solids concentration is increased to 4,500 p.p.m., about 80% sequestration can be attained in 4 hours and 99% sequestration can be attained in 24 hours. If the solids concentration is increased to about 7,200 p.p.m., 99% sequestration is attained in 1 hour. In other words, to accomplish phosphorus-containing material conversion and 80% sequestration requires a minimum of about 3,000 p.p.m. in the mixed liquor when holding sewage under aeration for 24 hours, about 4,200 p.p.m. when holding the same sewage under aeration for 4 hours, about 5,500 p.p.m. when holding the same sewage 1 hour and about 6,000 p.p.m. when holding the same sewage for about 15 minutes.

To treat the same sewage for 98% phosphate sequestration requires a minimum of about 4,500 p.p.m for 24 hours aeration and about 7,500 p.p.m. for 1 hour aeration. While the preferred range of solids content in the first aeration stage seeking about 90% phosphate sequestration may be 3,500 to 6,500 p.p.m., depending upon the aeration period, solids concentrations outside this range may be dictated by the wide variation in flow of incoming sewage received into the first aeration tank on an hourly basis, and because removal of phosphate is dependent on adequate treatment resulting from solids-liquid contact. As flow increases, average retention time of phosphatic material in the first aeration tank is reduced, which may be compensated for by increasing the solids concentration in the first aeration tank. Contrawise as flow decreases, retention time in the first aeration tank is longer, and to compensate, the solids concentration may be reduced. Consequently, inasmuch as the first stage of aeration is to be operated for maximum phosphate removal, a combination of flow measuring devices with solids measuring devices may be utilized to maintain control of the solids concentraiton and to maintain an optimum level of solids relative to the time that the liquid would be under aeration in the first aeration stage as determined by the throughput rate.

One of the primary problems in control of a system operating in accordance with this invention is the maintenance of a proper ratio of sludge solids to phosphate, when the influent sewage is subject to considerable variation due to change in phosphate content or due to change in influent sewage flow rate. When the areation tank is operating with a sludge solids loading in the mixed liquor which is near the minimum for a phosphate loading of, for example, 25 p.p.m., the phosphate loading due to change in phosphate content or flow of influent sewage can double in as short a time as a half hour or less. When this happens and the amount of sludge solids present per pound of phosphate consequently drops below the minimum requirement, phosphate sequestration will be limited to that proportion of the total which the sludge can associate with it and the balance will be found in the effluent when the mixed liquor is separated into effluent and sludge components, unless a compensating increase in the flow of phosphate depleted sludge from a reaeration holding tank is induced.

Following treatment in the first aeration operation, a mixed liquor containing a phosphate rich sludge is discharged to a separator. This transfer may be on a periodic or a continuous basis. In this separator, a sludge having the major portion of the phosphate anions associated with it, is separated from an aqueous medium which is discharged over a weir or other equivalent means. This aqueous medium has an appreciable content of material representing unsatisfied B.O.D., and some dissolved phosphate content, and may carry in suspension some unsettled solids. The B.O.D. content of this aqueous medium usually may be in the range between about 25% and 50% of the B.O.D. demand being introduced into the system. The dissolved phosphate content plus that associated with the sludge generally constitutes between 5% and 25% of the total phosphate of the mixed liquor of the first aerator stage.

Separation operations are conducted for the purpose of segregating a maximum of phosphate enriched sludge in an operationally practical length of time. It is preferred to conduct the separation in a high rate separator so as to accumulate a maximum amount of sludge in a minimum amount of time and to limit the residence time in the separator. Minimum residence time in the separator will vary with the type of separator and it is preferred that apparatus be used which limits residence time to a period not to exceed an hour an usually to about 30 minutes or less. Segregation of sludge as soon as appropriate solids concentrations are attained in the separator, may be accomplished by appropriate means such as airlifts operating in various types of hopper bottoms and equivalent apparatus.

Inasmuch as the liquid effluent from the separation operation may contain appreciable amounts of phosphate, due to the fact that the phosphate content of the mixed liquor may vary faster than the sludge concentration can be adjusted and appreciable quantities of unsatisfied B.O.D., due to too short a period of aeration, it is preferred to utilize two aeration and separation stages.

In addition, the second aeration stage provides treatment time for further reducing he B.O.D. and phosphate contents to acceptable levels without requiring excessively high solids concentrations in the first stage.

Liquor separated in the first settling operation is delivered to a second aeration stage where it is mixed with a phosphate depleted recycle sludge. When aeration is carried out in the presence of proper levels of concentration of solids, elimination of the still unsatisfied B.O.D. occurs simultaneously with tieing up of the soluble phosphates carried through in the effluent from the first separation stage.

The solids concentration carried in a second aeration stage of the embodiment of the system discussed may be considerably less than that in the first aeration stage.

Phosphate content of the influent liquor to the second aeration stage will be a major factor in determining the concentration of solids required to be carried for effective reduction of the phosphate content of the plant effluent to the desired levels. In general, if, for example, between 80% and 90% of the phosphate is associated with the sludge of the first separation stage, the solids content in the second aeration stage can be reduced proportionally to provide the same approximate ratio of phosphate to sludge solids as in the first aeration stage. Cognizance must be taken of the fact that such a reduction in solids content may be so drastic as to adversely affect the B.O.D. removal and, consequently, solids contents greater than indicated on the basis of phosphate removal requirements may be used.

A proper level of solids concentration in p.p.m. in this second aeration stage mixed liquor, dictated by the phosphate content, may be in the range between 500 and 3,000 p.p.m. but in no event less than about 500 p.p.m.

In general, it is preferred to utilize for B.O.D. treatment, a solids concentration in the second aeration stage in the range between about 1,000 p.p.m. and 3,000 p.p.m.

Air is introduced into the second stage of aeration in quantities and for a time necessary to attain substantially complete B.O.D. removal. In general, it is preferred to operate in this second stage of aeration with B.O.D. loadings in the range between 35 and 150 pounds of B.O.D. per day per 1,000 cubic feet of mixed liquor under aeration.

Mixed liquor is withdrawn continuously or intermittently from the second aeration stage. The mixed liquor is separated into an aqueous effluent low in phosphate and a sludge enriched with phosphate. While time for separation of the sludge is not a critical factor, accumulated sludge must not be held so long that phosphate reenters the effluent phase. A minimum practical retention time is usually about 30 minutes and the maximum time for sludge to be retained in the separation stage is about 3 to 4 hours, unless precautions are taken, such as agitation and aeration.

Segregated sludges can be dealt with individually or collectively. For example, a portion of the uncirculated or collective sludges can be discharged to waste prior to treatment to creat a phosphate-depleted sludge. Generally the combined sludges are delivered to a holding tank where the sludge is maintained in suspension by suitable agitation for a period generally of 1 to 6 hours. Sludge held in the holding tank generally should be starved for oxygen, at least periodically, so as to produce conditions favorable to release from the sludge of associated phosphates. Release of phosphates into a low phosphate content liquor is accomplishable in a period of 30 minutes to 2 hours. It must be borne in mind, that sludge to be used as seed material should not be held under anaerobic conditions for more than about 4 hours.

When agitating the contents of the holding tank in an anaerobic condition, the agitation must be of such a nature as to avoid sedimentation and preferably such as to ordinarily disintegrate sludge agglomerates. When the sludge is held for an appropriate period of at least 1 to 2 hours under anaerobic conditions, the solids of the system are reduced appreciably often as much as 50% and the phosphorus in the remaining solids is transfered in appreciable quantities to produce a phosphorus rich liquid.

Content of this holding or mixing tank are discharged continuously or intermittently to a settling tank for separation of a phosphorus rich liquor by decantation, flow over a weir or other suitable liquid solids separating operations. In the settling tank, the volume of phosphorus rich liquor produced constitutes between about 5% and 20% of the volume of incoming sewage. To avoid discharging a liquor with a high phosphorus content to a receiving stream, the phosphorus may be precipitated from the liquor by chemicals such as lime, ferrous chloride, etc., and the resultant liquid free of precipitated solids may be remixed with concentrated substantially phosphorus free sludge being recycled.

Phosphate-enriched aqueous medium may be treated in various ways to avoid discharging a liquor with too high a phosphate content to a receiving stream such as discharge to ground or evaporation or to contact with chemically reactive agents whereby phosphate anion is removed from solution.

Phosphate depleted sludge in suspensions whose solids content may be in the range between about 6,000 and 60,000 p.p.m. may be discharged to waste or any desirable proportion thereof recycled to form mixed liquor.

In another embodiment of the invention, phosphate rich sludge produced by aeration and separation operations is converted to a phosphate depleted sludge by mixing with pH adjusting solution and subjection to elutriation with low phosphate content aqueous medium, following which the phosphate depleted sludge is separated for recycle to the system. This method is shown and described in detail and claimed in the application of Forrest, Rychman, et al., Ser. No. 547,496, filed May 4, 1966.

The above described embodiment and the embodiment described in this application are related to a process described in the application of Forrest Ser. No. 458,689, filed May 25, 1965, in which a process for treating sewage is described wherein the primary supply of recycle sludge is obtained as a product of settling the sludge from the aerated mixed liquor obtained from the second stage of a two-stage aeration process. The sludge from the first stage of aeration of this process is discharged to waste and any portion of the first stage sludge which is needed for recycle as seeding material is desorbed of phosphates before return to the first stage of aeration.

The invention will be further understood from the schematic flow sheet. Comminuted sewage enters primary aeration tank 10 through a conduit 11. Air is introduced into tank 10 by dispersers 12 supported by their communication piping with a header 13 which delivers air from a source under pressure not shown. Mixed liquor flows from tank 10 to a first separation tank 14 through conduit 15.

Separation tank 14 is provided with a sump 16 and an overflow weir 17. A pump 18 of the conventional airlift type is provided to withdraw settled sludge.

Liquor overflowing weir 17 is delivered to the second aeration tank 20 through a pipe 19. Air is introduced into tank 20 by dispersers 21 supported by their communication pipe with a header 22 which delivers air under pressure from a source not shown.

Mixed liquor is delivered from tank 20 to a second separation tank 23 through conduit 24. The second separation tank 23 is provided with a sump 25 and an overflow weir 26. A pump 27 of the conventional airlift type is provided to withdraw sludge from sump 25, although other equivalent means may also be used.

Sludge removed from tank 23 is delivered by a conduit 28, pump 29, pump discharge conduit 30 to a combined sludge conduit 31. Combined sludge in pipe 31 may be delivered to waste through conduit 35. Flow in conduit 35 is controlled by valve 36 and in pipe 30 by valve 37.

Sludge passing valve 36 is delivered to a mixing tank 38 provided with a suitable agitator 39. Additional substantially phosphate free water may be introduced into mixing tank 38 through pipe 40 from a source not shown.

Treated sludge after a predetermined average residence time in tank 38 overflows a weir 41 and is delivered by conduit 42 into a separation tank 43. Separation tank 43 is provided with an overflow weir 44 and a sump 45. Sludge is removed from sump 45 by suitable means 46 such as by a pump.

Sludge discharged from separation tank 14 is delivered by conduit 32, pump 33 and pump discharge conduit 34 to a mixing tank 38 provided with suitable agitator means 39. Sludge after a predetermined average residence time in tank 38 overflows a weir 41 and is delivered by conduit 42 into a settling tank 43.

Settling tank 43 is provided with an overflow weir 44 and sump 45. Sludge is removed from sump 45 by suitable means 46. Sludge removed from the sump 45 as by pump 46 is delivered to a stream splitter 47 where predetermined volumes of sludge can be directed to waste through conduit 48 or to recycle conduit 50 or any appropriate combination thereof.

Liquid overflowing weir 44 is conducted by conduit 54 to a station 55 where suitable disposition is made of phosphate rich waste waters. This disposition may be to ground, to evaporation or to contact with chemically reactive agents for removal of phosphate anions from the water.

Sludge segregated for recycle, passing through conduit 50, is moved by pump 51 to tank 53 where air is dispersed therein by dispersers 56. Chemicals for adjustment of pH necessary to bring the sludge to approximate neutrality, such as caustic solution, is introduced into tank 53 through pipe 57, from a source not shown.

Reactivated sludge removed from tank 53 by suitable means such as an airlift is delivered through conduit 58 to a stream splitter 59 where predetermined volumes of sludge can be directed to aeration tank 10 through conduit 60 and to aeration tank 20 through conduit 61 and 61(a).

While the phosphate content of the recycle sludge may be sufficiently low for return to the first aeration tank, it may be desirable to have a recycle sludge and associated liquid of a still lower phosphate content for the second aeration tank. In the latter event, sludge in conduit 61 is delivered through pipe 62 to a holding tank 63 where it is washed with water delivered by pipe 64. Sludge and liquor removed from tank 63 is separated into a clarified liquor and a sludge concentrate in suitable means such as a tank 65 provided with a sump and an overflow weir 66. A pump 67 of the conventional airlift type is provided to withdrawn settled sludge and deliver it to tank 20 through pipe 68.

When sewage is treated in accordance with this invention, effluent separated in the second separation tank may have a phosphate reduction of about 80% to 95% and a B.O.D. reduction of about 90% to 95%.

The above-detailed description of this invention has been given by way of illustration without any intention that the invention be limited to the exact conditions set forth. No unnecessary limitations should be understood therefrom as modifications will be obvious to those skilled in the art.

I claim:

1. In an aerobic sewage treatment process adapted to accept a phosphorus-containing influent sewage and to discharge a substantially phosphate free aqueous effluent, said process involving aeration and sludge separation stages, the steps comprising continuously commingling phosphorus-containing influent sewage and phosphate-depleted sludge in a holding zone to form a mixed liquor, aerating mixed liquor formed by commingling phosphorus-containing influent sewage with phosphate depleted recycle sludge for a period in excess of that required for transformation of phosphorus-containing material to sequesterable phosphates in the presence of the concentration of suspended sludge-solids present, said mixed liquor having a minimum suspended sludge-solids concentration at least sufficient to catalyze B.O.D. removal and in no event less than 60 pounds of suspended solids per pound of phosphate-containing material introduced into the mixed liquor under aeration, withdrawing aerated mixed liquor, separating said aerated mixed liquor into a low suspended solids content aqueous medium phase of relatively low phosphate content and a phase comprising phosphate rich sludge concentrated in low phosphate content aqueous medium, agitating said phosphate rich sludge in contact with low phosphate content aqueous medium for a period of time effecting transfer of an appreciable portion of water-soluble phosphate material associated with the sludge to the aqueous medium, separating phosphate enriched aqueous medium from phosphate depleted sludge and recycling said phosphate depleted sluge for formation of mixed liquor in the aeration zone.

2. The process according to claim 1 wherein the suspended solids concentration in the mixed liquor is between 60 pounds and 250 pounds per pound of phosphorus-containing material present.

3. The process according to claim 1 wherein the phosphate rich sludge is agitated in contact with low phosphate content aqueous medium for from 1 to 6 hours before separation of the phosphate depleted sludge for recycle.

4. The process according to claim 1 which includes the additional step of contacting said phosphate rich aqueous medium with chemically reactive agents whereby phosphate ion is removed from solution.

5. The process according to claim 1 wherein at least a portion of the phosphate depleted sludge is reaerated in a holding zone whereby a quantity of sludge is maintained available for discharge into the mixed liquor to compensate for fluctuations in phosphate content of the mixed liquor under aeration.

6. In a sewage treatment process adapted to accept a phosphate-containing influent sewage and to discharge a substantially phosphate free aqueous effluent, the steps comprising introducing sewage having phosphorus-containing material as one component thereof and an unsatisfied B.O.D. into a system for a sequential liquid flow arrangement of a first aeration zone, a first sludge separation zone, a second aeration zone for treatment of liquor discharged from said first sludge separation zone and a second separation zone, said first aeration zone holding a mixed liquor formed of phosphate depleted recycle sludge and said sewage, aerating said mixed liquor for a period in excess of that required for transformation of phosphorus-containing material into sequesterable phosphates in the presence of the concentrate of suspended solids present, said mixed liquor having a minimum suspended sludge-solids concentration at least sufficient to catalyze B.O.D. removal and in no event less than 60 pounds of suspended solids per pound of phosphorus-containing material in the mixed liquor under aeration, withdrawing aerated mixed liquor from said first aeration zone to the first separation zone where the time of concentration is a maximum of about 1 hour, removing a phosphate rich sludge from said first separation zone, separately discharging an aqueous medium from said first separation zone, mixing discharged aqueous medium with phosphate depleted recycle sludge to form a second body of mixed liquor for treatment in said second aeration zone having at least 500 p.p.m. of suspended sludge-solids and in no event less than 60 pounds of suspended sludge-solids per pound of phosphorus-containing material present, introducing air into said second body of mixed liquor in quantities to effectuate completion of the B.O.D. removal, discharging mixed liquor from said second body to said second separation zone, separating an effluent for discharge from the system, recovering sludge from said second separation zone, combining the phosphate rich sludge from said first separation zone and the sludge recovered from said second separation zone and aqueous mediums associated therewith in a mixing zone where the liquid contents are agitated for a period in the range between about 1 and 6 hours whereby phosphates associated with said mixture of sludges are transferred to the aqueous medium, withdrawing treated material from said mixing zone to a separation zone, segregating a concentrate of phosphate depleted sludge in said separation zone, discharging a phosphate rich liquor from said separation zone and recirculating the phosphate depleted sludge and its associated liquid to said aeration zones.

7. The process according to claim 6 in which said mixed liquors have a suspended solids concentration of between 80 to 150 pounds of suspended sludge-solids per pound of phosphorus-containing material in the mixed liquor under aeration.

8. The process according to claim 6 in which the phosphate depleted sludge being recycled to the second aeration zone is mixed with substantially phosphate free water, the mixture separated into waste water and washed sludge concentrate and the washed sludge concentrate utilized for mixing with the aqueous medium discharged from said first separation zone to form the mixed liquor to be aerated in said second aeration zone.

References Cited
UNITED STATES PATENTS 3,235,766  2/1966  Levin _____ 210—6

OTHER REFERENCES

Feng, T. H.: Phosphorus and The Activated Sludge Process, Water & Sewage Works, November 1962, vol. 109, pp. 431–436.

MICHAEL E. ROGERS, *Primary Examiner.*